June 7, 1927.
G. H. RICHEY
1,631,693
BROACHING TOOL
Filed Oct. 18, 1926
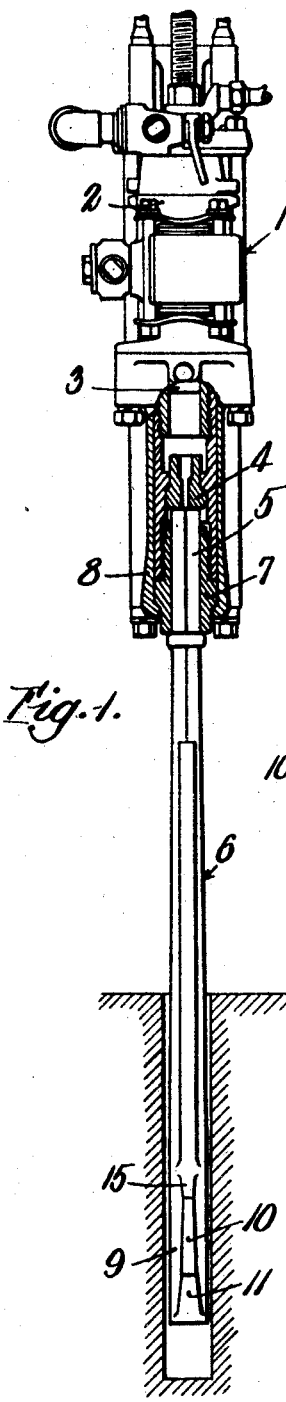
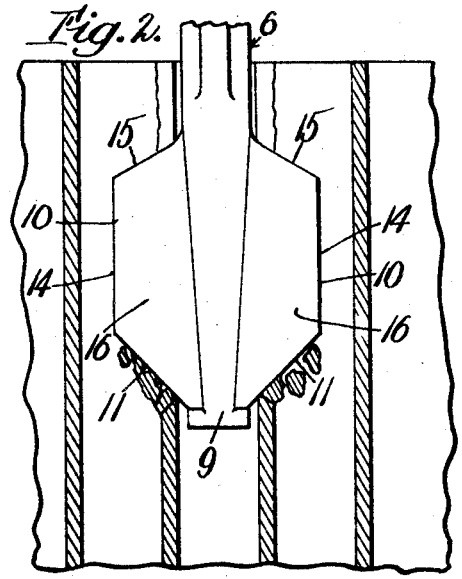
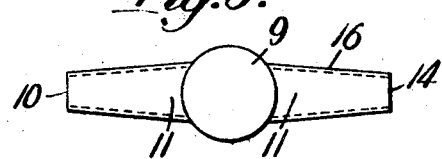
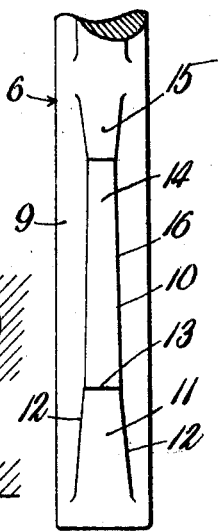
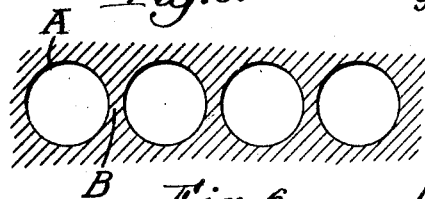
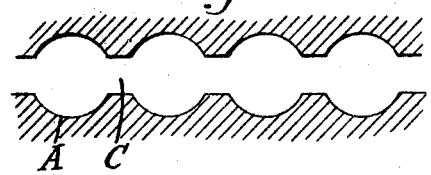
Inventor:
George H. Richey.
by
Amis A. Maxson.
Attorney.

Patented June 7, 1927.

1,631,693

UNITED STATES PATENT OFFICE.

GEORGE H. RICHEY, OF BOSTON, MASSACHUSETTS ASSIGNOR TO SULLIVAN MACHINERY COMPANY, A CORPORATION OF MASSACHUSETTS.

BROACHING TOOL.

Application filed October 18, 1926. Serial No. 142,482.

This invention pertains to broaching tools, and more particularly to broaching tools of the impact type especially adapted for channeling rock.

In channeling rock, especially when cutting blocks or dimension stones in quarries, a series of substantially equi-distantly relatively closely spaced holes are drilled in the rock by means of a usual hammer drill along the line of the desired channel. Having produced the required number of holes in the rock, it has been found desirable to broach or break away the solid portion or partition of the rock between the holes to form a continuous channel. The broaching operation is substantially a repetition of the drilling operation with a broaching tool substituted for the usual drill bit in the hammer drill. Heretofore it has been found that the broaching tools have a tendency to stick or bind in the hole, due to the dust or cuttings piling up in the hole around the broaching tool.

Among the objects of the present invention is to provide an improved broaching tool which will cut effectively and wherein all tendency of the tool to stick or bind in the hole is reduced to a minimum. Another object of this invention is to provide an improved broaching tool of exceedingly simple and rugged character which may be manufactured at a minimum of expense and which may be sharpened with facility. Still another object of this invention is to provide an improved broaching tool for breaking away the partitions of rock between a series of closely spaced drill holes, thus forming a channel. These and other objects will, however, hereinafter more fully appear.

In one embodiment the invention may be comprised in a broaching tool of the so-called "bat wing" type having a cylindrical body portion adapted to center and guide the broaching tool in the drill hole, and having laterally projecting double-tapered wings. The wings may have inclined bottom cutting surfaces which are made flat to obtain a percussive action on the rock and the side edges of the cutting surface may be designed to perform a shearing action on the rock. The flat side surfaces of the wings may be tapered back from the cutting edges to provide clearance while the wings may be of wedge shaped cross section to prevent binding of the broaching tool in the drill hole.

In the accompanying drawing there is shown for purposes of illustration one form which the invention may assume in practice.

In this drawing,—

Fig. 1 is an elevational view, partially broken away in section, of a hammer rock drilling machine with which the improved broaching tool is associated.

Fig. 2 is an enlarged front elevational view of the improved broaching tool, the broaching tool being disposed in operative position in a drill hole while cutting a channel.

Fig. 3 is an end elevational view of the broaching tool shown in Fig. 2.

Fig. 4 is a side elevational view of the broaching tool shown in Figs. 2 and 3.

Fig. 5 is a diagrammatic view indicating several drill holes prior to the broaching operation.

Fig. 6 is a diagrammatic view illustrating the drill holes subsequent to the broaching operation.

In the illustrative embodiment of the invention there is shown a rock drill of the hammer type generally designated 1, herein of any standard type having a usual cylinder 2 in which a hammer piston is reciprocable in the usual manner, the hammer piston having a forwardly projecting striking bar 3 which is adapted to impart a series of impact blows to a usual striking plug 4. The impact blows of the hammer piston are transmitted through the striking plug 4 to the shank 5 of the improved broaching tool generally designated 6. The broaching tool 6 is carried within a usual chuck 7 disposed within a chuck housing 8 of the drill. As the specific construction of this rock drill does not enter into this invention, further detailed description of the same appears to be unnecessary.

The improved broaching tool 6 comprises a cylindrical body portion 9 which serves to center and guide the broaching tool in the drill hole as will later be described. The body 9 has formed thereon laterally projecting wings 10 of improved form, herein preferably called "bat wings". The wings 10 are so constructed as to enable the broaching tool to break away the rock in a more effective manner and to prevent binding of the broaching tool in the drill hole. As illustrated, the wings 10 have formed thereon at their lower sides inclined flat percussive surfaces 11 having lateral shearing edges 12. The flat surfaces 11 of the wings are herein preferably formed at an angle of forty-five degrees, it having been found that such an angle is most effective under the conditions encountered. The flat surfaces 11 terminate in lateral shearing edges 12 which converge outwardly and recede rearwardly to meet in edges 13 which form the lower edges of parallel plane surfaces 14. The upper surfaces 15 of the wings slope downwardly to junctions with the surfaces 14 and also are widest adjacent the body of the tool. The surfaces 14 are widest at their bottom edges 13 and the lateral edges of the surfaces 14 and 15 and the shearing edges 12 at each side of the bit lie in planes, whereby the lateral surfaces 16 of the wings are plane surfaces which converge outwardly and upwardly.

In the use of the improved broaching tool it will herein be noted that after a series of alined, closely spaced holes A are drilled in the rock as clearly shown in Fig. 5, the usual drill bit is withdrawn from the chuck 7 of the hammer drill and the improved broaching tool 6 substituted therefor. The operator then inserts the lower portion of the cylindrical body 9 of the broaching tool in one of the drill holes A and the hammer piston of the impact motor is then suitably actuated, causing the striking plug to impart a series of impact blows to the shank 5 of the tool 6 in a well known manner. These hammer blows on the shank of the broaching tool cause the flat bottom surfaces 11 of the bat wing to have a percussive action while the lateral edges 12 have a shearing action and consequently the partitions B between the adjacent holes are effectively broken away as the drilling machine is fed downwardly. The body portion 9 of the broaching tool centers the tool in the drill hole and guides the wings during the broaching operation. The inclined sides 16 of the wings form clearance for the inclined cutting surfaces, thereby preventing binding of the broaching tool in the hole due to the piling up of dust and cuttings around the tool. Furthermore, the tapered flat surfaces of the wedge-shaped portions of the wings have a wedging action on the rock, thereby increasing the effectiveness of the tool and these inclined sides further reduce the tendency of the tool to bind or stick in the holes. After the broaching operation is completed on the first set of holes, the broaching tool is withdrawn and inserted in the next adjacent holes, this operation being repeated until a continuous cut or channel is made in the rock as indicated at C in Fig. 6, thus enabling the rock or stone to be split with facility and with accuracy.

As a result of this invention an improved broaching tool is provided of the so-called "bat wing" type having double tapered wings whereby the effectiveness of the tool is materially increased and whereby all tendency of the tool to bind or stick in the holes is reduced to a minimum. It will further be noted that an improved broaching tool is provided of exceedingly simple and rugged character which may be manufactured with facility and at a minimum of expense. These and other advantages of the improved broaching tool will be clearly apparent to those skilled in this art.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A broaching tool of the impact type comprising a shank having a cylindrical body portion forming a guide, and a laterally projecting wing formed on said body portion, said wing having a percussive surface tapering outwardly and receding rearwardly, an upper surface likewise tapering outwardly but sloping forwardly, an outer surface joining said other surfaces, and lateral plane surfaces.

2. A broaching tool of the impact type comprising a shank having a cylindrical body portion forming a guide, and a laterally projecting wing formed on said body portion, said wing having a percussive surface tapering outwardly and receding rearwardly, an upper surface tapering outwardly and sloping forwardly, a straight outer surface disposed parallel with the longitudinal axis of the tool joining said inclined surfaces, and lateral plane surfaces.

3. A broaching tool of the impact type comprising a shank having a cylindrical body portion forming a guide, and laterally projecting wings formed on said body portion, said wings each having a percussive surface tapering outwardly and receding rearwardly, an upper surface likewise tapering outwardly, an outer surface joining said other surfaces, and lateral plane surfaces.

4. A broaching tool of the impact type comprising a shank having a cylindrical body portion forming a guide, and laterally projecting wings formed on said body portion, said wings each having a percussive surface tapering outwardly and receding rearwardly, an upper surface likewise tapering outwardly, an outer surface tapering upwardly and joining said other surfaces, and lateral plane surfaces.

In testimony whereof I affix my signature.

GEORGE H. RICHEY.